(12) United States Patent
Dragt

(10) Patent No.: US 11,751,598 B2
(45) Date of Patent: Sep. 12, 2023

(54) SMART CUTTER FOR HIGH SPEED PRODUCE PROCESSING

(71) Applicant: Agile Innovations, Bakersfield, CA (US)

(72) Inventor: Steven Richard Dragt, Bakersfield, CA (US)

(73) Assignee: Agile Innovation, Inc., Bakersfield, CA (US)

( * ) Notice: Subject to any disclaimer, the term of this patent is extended or adjusted under 35 U.S.C. 154(b) by 729 days.

(21) Appl. No.: 16/870,845

(22) Filed: May 8, 2020

(65) Prior Publication Data

US 2020/0352208 A1 Nov. 12, 2020

Related U.S. Application Data

(60) Provisional application No. 62/845,245, filed on May 8, 2019.

(51) Int. Cl.
| | |
|---|---|
| *A23N 7/02* | (2006.01) |
| *B26D 7/32* | (2006.01) |
| *B26D 5/30* | (2006.01) |
| *B26D 7/06* | (2006.01) |
| *B26D 7/18* | (2006.01) |

(52) U.S. Cl.
CPC ............... *A23N 7/026* (2013.01); *B26D 5/30* (2013.01); *B26D 7/0625* (2013.01); *B26D 7/1845* (2013.01); *B26D 7/32* (2013.01); *B26D 2210/02* (2013.01)

(58) Field of Classification Search
CPC ........ A23N 7/026; B26D 5/30; B26D 7/0625; B26D 7/1845; B26D 7/32; B26D 2210/02

USPC .......................................................... 99/539
See application file for complete search history.

(56) References Cited

U.S. PATENT DOCUMENTS

| 3,745,864 | A | * | 7/1973 | Watson | ................... B26D 1/585 83/369 |
| 4,015,183 | A | | 3/1977 | Miyakita | |
| 4,091,315 | A | | 5/1978 | Hayashi et al. | |
| 4,293,774 | A | * | 10/1981 | Pongracz | ................ B65B 41/18 250/548 |
| 4,428,263 | A | * | 1/1984 | Lindee | ..................... B26D 7/32 83/354 |
| 4,557,019 | A | * | 12/1985 | Van Devanter | .......... B26D 7/30 83/365 |
| 4,576,071 | A | | 3/1986 | Payment | |

(Continued)

FOREIGN PATENT DOCUMENTS

| EP | 2957175 | A1 | 12/2015 |
| GB | 2315991 | A | 2/1998 |
| WO | WO03101686 | A2 | 12/2003 |

*Primary Examiner* — Omar Flores Sanchez
(74) *Attorney, Agent, or Firm* — James M. Duncan; Scanlon Duncan LLP

(57) ABSTRACT

A produce cutting apparatus is utilized, among other things, for making single cuts in an elongated produce product to trim ends, segment the product into variable length segments, make fixed length segments, and cutting out undesirable portions of the produce product. Using a combination of a feed belt, sensor, radial cutter apparatus and programmable controller, the apparatus precisely locates each cut. The cutting blade makes a single cut with each rotation of the radial cutter apparatus. The apparatus may further have a piece removal system and a product holding system.

19 Claims, 12 Drawing Sheets

(56) References Cited

U.S. PATENT DOCUMENTS

| | | | |
|---|---|---|---|
| 4,868,951 A * | 9/1989 | Akesson | A22C 25/12 |
| | | | 452/155 |
| 4,875,254 A | 10/1989 | Rudy et al. | |
| 5,142,955 A | 9/1992 | Hale | |
| 5,163,865 A * | 11/1992 | Smith | A22C 25/18 |
| | | | 83/956 |
| 5,335,571 A | 8/1994 | Pike | |
| 5,623,868 A | 4/1997 | McKenna | |
| 5,862,728 A | 1/1999 | Giamello | |
| 5,916,354 A | 6/1999 | Dragt | |
| 6,308,600 B1 | 10/2001 | Dragt | |
| 6,764,295 B2 | 7/2004 | Jensen et al. | |
| 7,048,957 B2 | 5/2006 | Alsobrook et al. | |
| 7,430,947 B2 | 10/2008 | Julian et al. | |
| 7,748,303 B2 | 7/2010 | Julian et al. | |
| 8,511,226 B2 * | 8/2013 | Knorr | A23N 15/04 |
| | | | 99/635 |
| 8,549,996 B2 | 10/2013 | Pryor et al. | |
| 9,364,020 B2 | 6/2016 | Tao et al. | |
| 10,160,134 B2 * | 12/2018 | Adams | H04N 23/60 |
| 10,442,102 B2 | 10/2019 | Van Buynder et al. | |
| 10,555,539 B2 * | 2/2020 | Finnsson | B26D 1/45 |
| 2003/0121422 A1 * | 7/2003 | Mendenhall | B26D 5/00 |
| | | | 83/13 |
| 2003/0177879 A1 | 9/2003 | Abarzuza | |
| 2004/0094006 A1 | 5/2004 | McGarvey et al. | |
| 2005/0175752 A1 | 8/2005 | Alsobrook et al. | |
| 2005/0247214 A1 * | 11/2005 | Huddle | A23N 15/04 |
| | | | 99/636 |
| 2008/0295661 A1 * | 12/2008 | Turatti | A23N 15/12 |
| | | | 83/104 |
| 2009/0071349 A1 | 3/2009 | Everett et al. | |
| 2012/0048078 A1 | 3/2012 | Weber | |
| 2015/0044338 A1 * | 2/2015 | Nagle | A23P 10/20 |
| | | | 425/142 |
| 2015/0205288 A1 * | 7/2015 | Strong | A22C 17/002 |
| | | | 700/114 |
| 2015/0360381 A1 * | 12/2015 | Tomlinson | B26D 5/086 |
| | | | 83/337 |
| 2016/0288355 A1 * | 10/2016 | Sørensen | A22C 17/002 |
| 2017/0210025 A1 * | 7/2017 | Dopp | B26D 5/005 |
| 2017/0238594 A1 * | 8/2017 | Turatti | B26D 7/018 |
| 2018/0029246 A1 * | 2/2018 | Blaine | B26F 3/004 |
| 2018/0199613 A1 * | 7/2018 | Vougioukas | A23N 15/04 |
| 2018/0281220 A1 * | 10/2018 | Sørensen | B26D 7/0625 |
| 2019/0216097 A1 * | 7/2019 | Scherz | B26D 7/0625 |
| 2020/0375203 A1 * | 12/2020 | Pfanstiel | B26F 3/004 |
| 2022/0117244 A1 * | 4/2022 | Gronkjær | B26D 1/16 |

* cited by examiner

SMART CUTTER FOR HIGH SPEED PRODUCE PROCESSING

RELATED APPLICATIONS

This non-provisional application claims priority to U.S. Application No. 62/845,245 filed on May 8, 2019, to which application this inventor claims domestic priority.

BACKGROUND OF THE INVENTION

Produce processing frequently requires that an item of produce be trimmed prior to packaging and delivery to the consumer. Such processing is particularly true for elongated fruit or vegetable products such as carrots, parsnips, green beans, pod peas, asparagus, romaine, squash, peppers, celery, and similar products.

It is desirable that an apparatus which processes products does so with minimal product waste. It is also desirable that such an apparatus provide a variety of different trimming and cutting options including, among other things, providing a variety of product lengths, allowing multiple cutting angles, and facilitating defect removal with a minimum loss of good product. It is also desirable that such an apparatus be relatively simple, easy to maintain and clean, and be relatively small in size.

SUMMARY OF THE INVENTION

Embodiments of the present invention satisfy the need discussed above. The present invention pertains to cutting devices for elongated fruit or vegetable products such as carrots, parsnips, green beans, pod peas, asparagus, romaine, squash, peppers, celery or similar products. More specifically, the invention pertains to cutting devices capable of making single cuts to trim an end, or multiple cuts of variable lengths to optimize the yield of a processing step when making segments from variable length raw materials.

Embodiments of the present invention provide a means of trimming and/or cutting produce products in a programmed manner. Depending on the product and the desired outcomes, a programmed trimming operation may simply trim each end to a specified length for each identifiable end, trim one particular end and make a cut a measured distance from that end cut, make fixed length segment cuts with the length adjusted by the program, or embodiments of the invention may trim the ends and make length optimized segment cuts between the trimmed ends. The acceptable product may be advanced in one direction while a secondary product and/or undesired product is advanced in a second or third direction.

Embodiments of the present invention provide a means of removing an end or ends of a produce product, or dividing elongated products into fixed or variable lengths based on programming logic which may be entered for each application. In the case of variable length raw produce products, whose cut lengths are allowed some variance around a standard length, embodiments of this invention will provide a greater yield of raw materials than prior art devices while maintaining the cut length specifications. In the case of end removal, embodiments of the present invention may cut produce products on one or both ends with programmed end cut length(s) or a length between cuts and remove the cut end(s) from the good product flow. Embodiments of the invention may separate pieces based on diameter and divert segments meeting certain dimensional criteria to a separate stream. Embodiments of the invention will be able to make a long cut from the large end of a tapered product, divert the long cut and then cut the rest of the product into optimized segments. In the case of defect removal, embodiments of the invention may cut and remove end defect or mid-body defect parts from the whole and divert those defects to a separate stream.

Embodiments of the invention may use a variety of low-cost sensor options to detect and measure the length (and diameter when needed) of each different product to calculate the ideal cut sequence based upon pre-programmed input to a processor. Embodiments of the invention may use a cutting apparatus which, as described further below, moves with the product thereby providing a high-speed cutting process that takes place in line with the most natural way that long produce products are mechanically oriented. Embodiments of the invention may provide cuts which are perpendicular to the length of the produce product and minimize bias cuts. Embodiments of the invention may cut extremely long produce pieces or allow continuous feed of the product. Embodiments of the disclosed invention provide a high volume and low cost method of processing produce products, and are capable of doing so in a small area and requiring simple maintenance with little or no water use. For some embodiments of the invention, foreign material introduced into the cutter will pass through without the cutter actuating and potentially damaging the blades.

Embodiments of the disclosed invention may accomplish the following operations with specific produce products:

Carrot segment cutting—carrots for processing are optimally segmented by removing the green crown end and separating the remainder of the product into segments that meet the product length specifications while utilizing the full good length of the raw material. Optionally, the tip may be removed at a particular diameter to comply with minimum diameter specifications. Optionally, portions of the root with surface defects are removed from the segments being cut.

Carrot tipping and topping—carrots for processing have their green crown ends removed at a particular distance from the shoulder of the root and optionally, have a tip cut at a particular length from the top cut or at a particular diameter.

Carrot long and short segment cuts—carrots for processing have a top cut followed by a segment cut of a specified length from the large diameter end of the root which is then followed by a series of variable length segment cuts that optimize the yield of the remaining part Parsnips have their green stem removed without cutting the root followed by a fixed length cut so that all the products are a similar length Green beans are trimmed at both ends and the good product is cut into segments that optimize the yield of the remaining part Asparagus is cut into segments before processing. Segments with color defects are removed from the segments moved forward in the process.

Asparagus is cut to a target spear length measured from the tip

Peppers are cut to remove the stem and calyx

Celery stalks are cut to remove the white base flare and then to length

Celery stalks are cut to remove the white base flare and then segments are cut out of the remaining stalk material Romaine is cut to remove the base and then to length or to segments of a fixed length Elongated squash have their stem ends cut off at a target distance from the shoulder and then have the flower end of the product cut at a different dimension prior to processing.

DETAILED DESCRIPTION OF THE INVENTION

Figure 1:
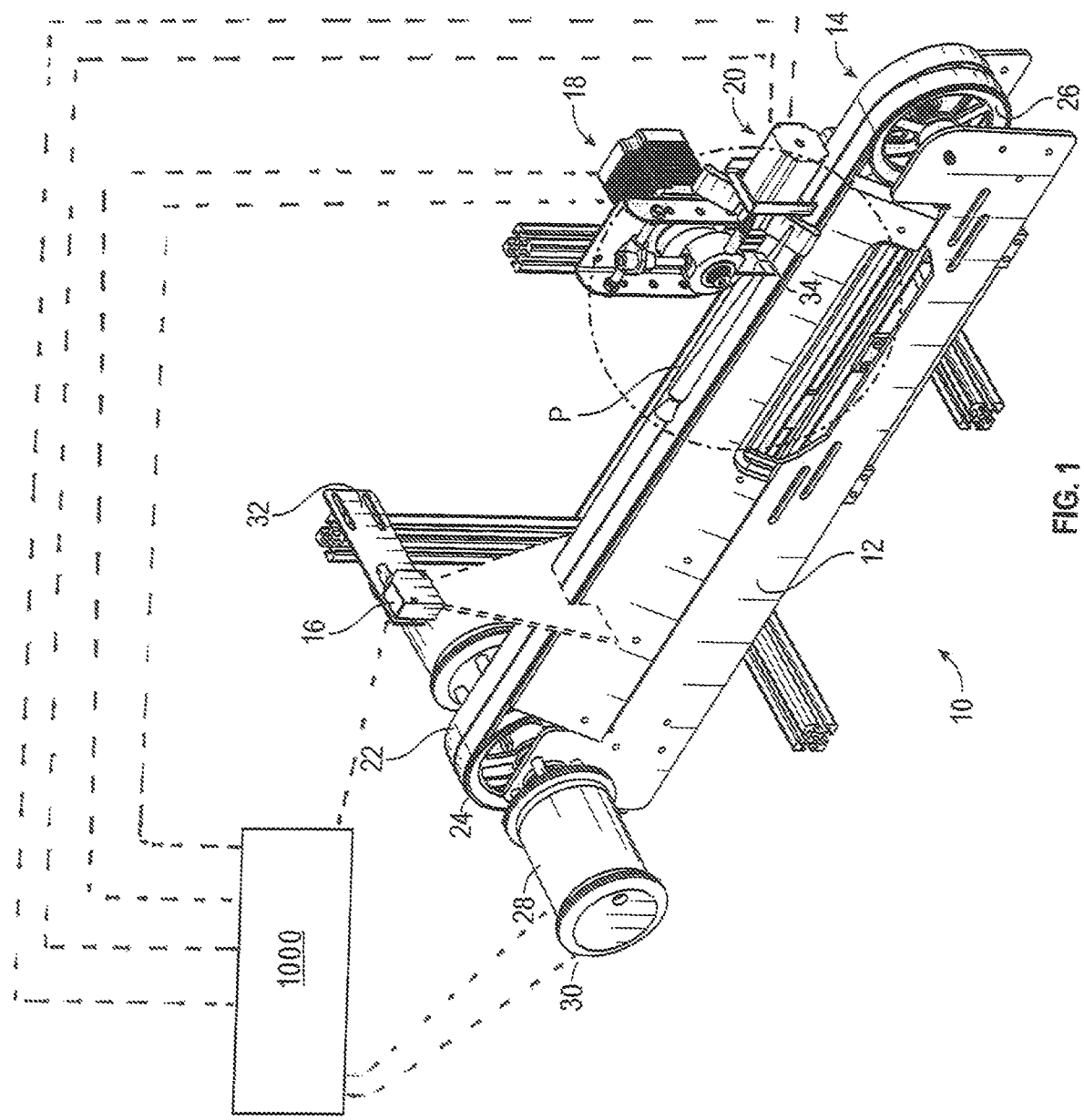
FIG. 1 depicts perspective view an embodiment of the present invention.

Referring now to the Figures, an embodiment of the produce cutting apparatus 10 may comprise a frame 12, a feed belt assembly 14, a sensing device 16, and a radial cutter assembly 18. Embodiments of the produce cutting apparatus may further comprise a piece removal system 20.

Produce products 100 may be delivered to the feed belt assembly 14 by a separate produce product delivery system (not shown). As indicated above, the produce products 100 may include carrots, parsnips, green beans, asparagus, peppers, celery stalks, romaine lettuce, elongated squash, and other produce products having a generally elongated shape. Feed belt assembly 14 generally comprises an endless loop belt 22 (or chain, conveyor, etc.) is disposed on a drive wheel 24 and an idler wheel 26 which are mounted within a configuration of a frame assembly such as the frame 12 depicted in the figures. A variable speed motor 28 induces rotational motion to drive wheel 24 by direct drive, belts, drive reducers, transmission, or other coupling apparatus know in the art. A transducer, such as radial encoder 30 mounted on a shaft of motor 28, may be utilized to ascertain the position of the motor shaft and thereby generate output from which the velocity of belt 22 may be ascertained.

As depicted in the figures, one or more sensors 16 are mounted in a position to scan the produce products P as the products pass by on the belt 22 in proximity to the sensor. Sensor 16 may be mounted on a bracket 32 which may suspend the sensor 16 above the belt 22. Output from the sensor is transmitted to a programmable controller 1000. Output from the radial encoder 30 may also be transmitted to programmable controller 1000. Programmable controller 1000 may also control the speed of variable speed motor 28.

The sensor 16 or sensors may be ultrasonic distance sensors, matrix/curtain sensors, edge sensors, color sensors, camera systems or any other sensor or system of sensors providing presence of product signals plus the data needed by the logic processor. The sensor 16 scans the produce product P to determine at least one dimensional feature of the produce product P, such as length, width, diameter, etc. The sensor may also be utilized to detect the location in the produce product of a stem, leaf, calyx or root portion, detect irregularities in the produce product, or the location of a base of the produce product. Utilizing the data received from the sensor, the programmable controller will determine how to process the food product 100 according to inputted instructions, and provide instructions to the rotary cutter assembly to implement the desired processing.

Figure 2:
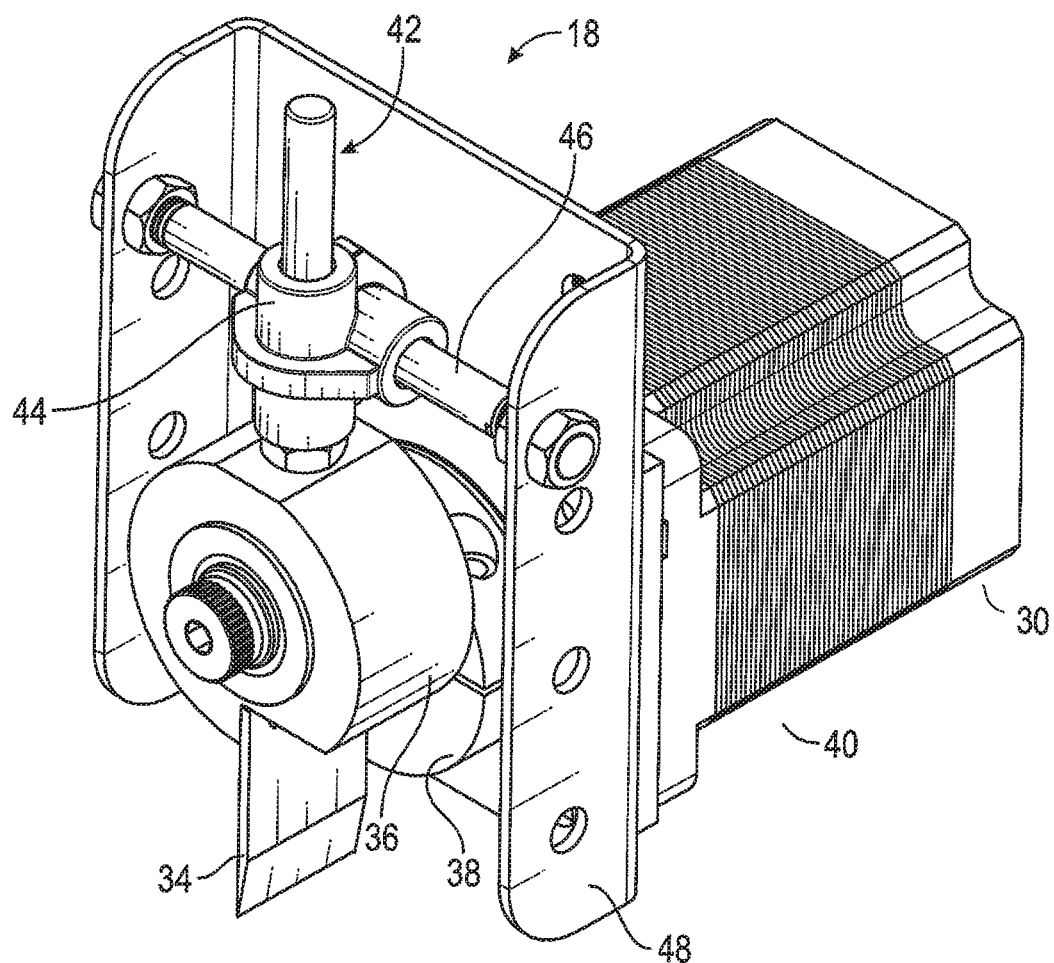
FIG. 2 depicts a perspective view of an embodiment of a cutter assembly which may be utilized in embodiments of the invention.
Figure 3:
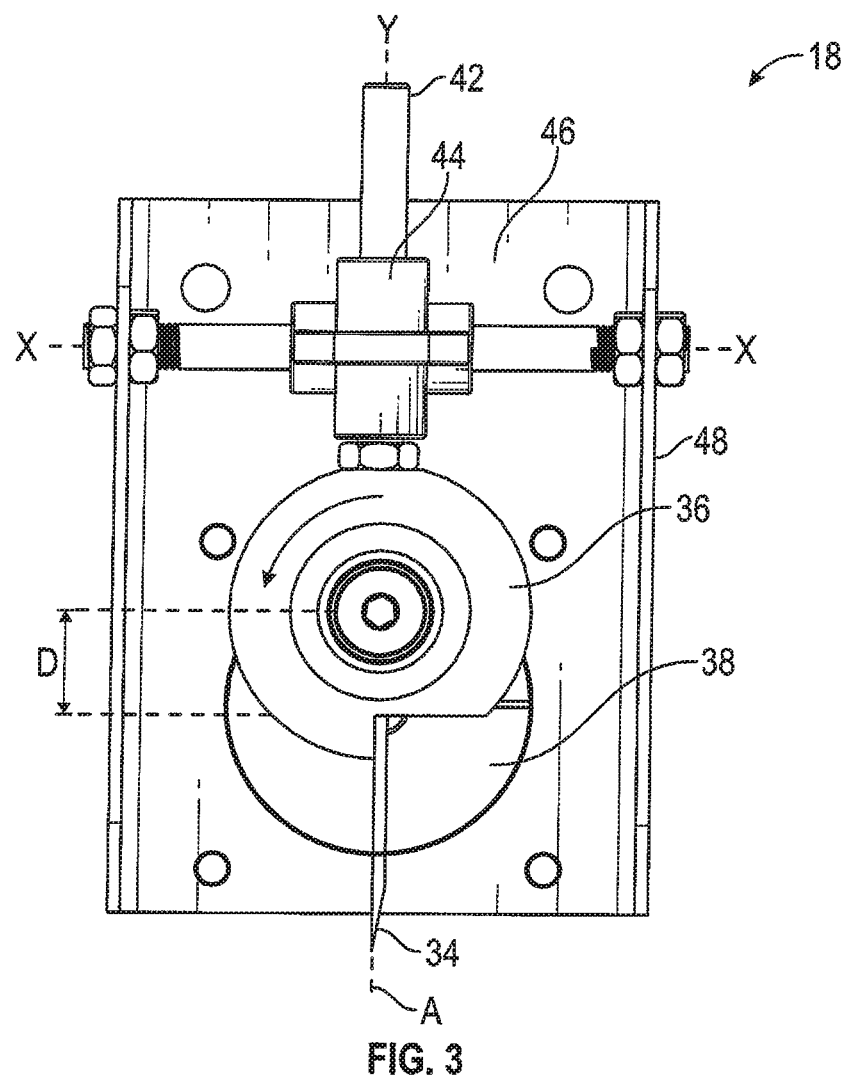
FIG. 3 depicts a front view of the cutter assembly depicted in FIG. 2.
Figure 4:
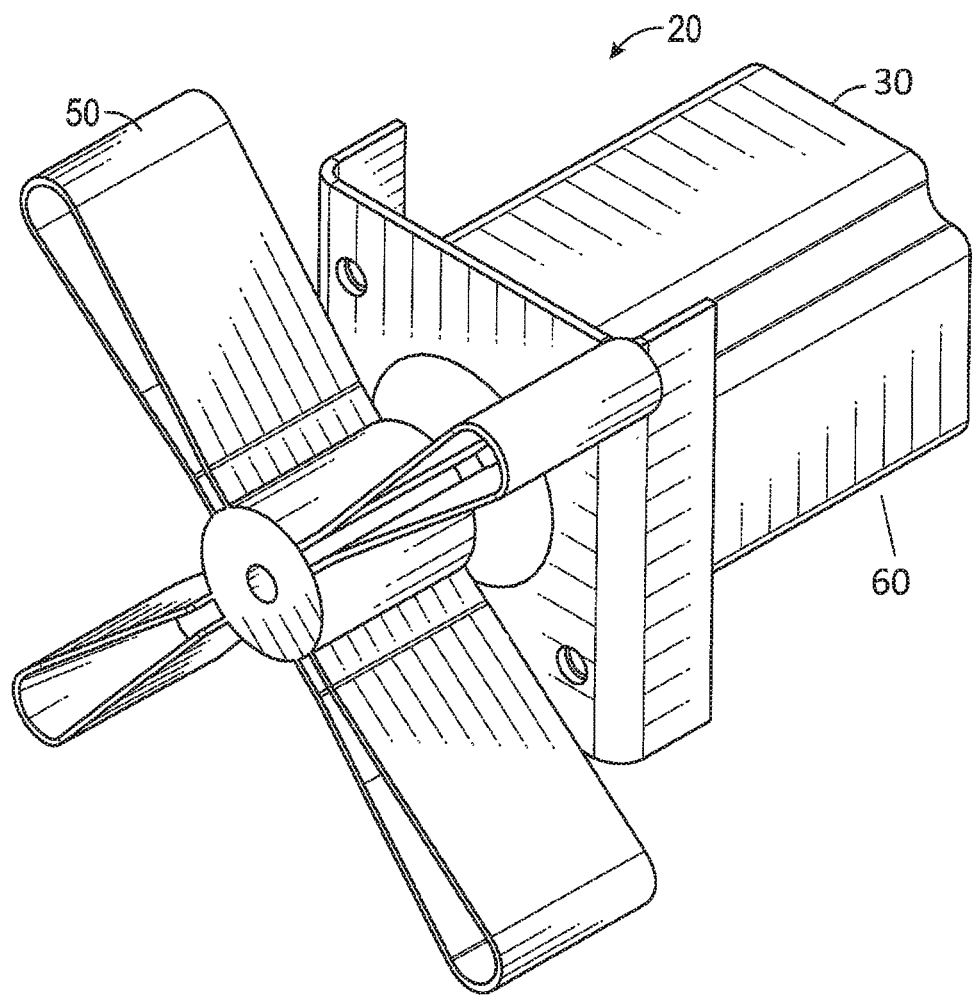
FIG. 4 depicts a perspective view of an embodiment of a piece removal assembly which may be utilized in embodiments of the invention.

FIGS. 2-3 provide close-up views of an embodiment of a radial cutter assembly 18. The radial cutter assembly 18 has a blade 34 which is mounted to lobe member 36. Lobe member 36 is attached to drum member 38 at a point offset to the center of the drum. Drum member 38 is attached at its center to a motor shaft (not shown) which extends from variable speed motor 40. Variable speed motor 40 may be controlled by programmable controller 1000. A radial encoder 30 may be utilized to transmit positional information to programmable controller 1000.

When drum member 38 and the attached lobe member 36 rotate by operation of motor 40, blade 34 describes a motion profile which is resolvable into an X component and a Y component, with the magnitude of travel along either the X-axis or the Y-axis defined by the offset D between the center of the drum member 38 and the attached lobe member 36 as indicated in FIG. 3. FIG. 3 shows blade 34 in the uppermost position on the Y-axis, whereas FIG. 1 depicts blade 34 in the lowermost position on the Y-axis. For the embodiments depicted in the Figures, drum member 38 will rotate in counter-clockwise direction, Lobe member 36 is attached to rod 42. Rod 42 extends through guide 44, which allows vertical motion of rod 42 within the guide. Guide 44 is disposed on horizontal shaft 46 which may be attached within bracket 48 as best shown in FIG. 2.

In one embodiment, the long axis A of blade 34 is in parallel alignment with the Y axis, although in other embodiments the long axis A may be offset from the Y axis to produce bias cuts in the produce product P. In the portion of the rotation in which the blade 34 performs a cutting function, the X vector is moving in the direction of the belt travel and reaches its maximum X direction velocity at the bottom of its stroke. If the X velocity of the blade 34 is set to equal the X velocity of the belt at the point of impact, the blade 34 runs away from the uncut produce product and pushes the cut piece forward. The Y-axis motion of the blade 34, which provides the cutting function, is at maximum velocity at the 9 o'clock position for any particular angular velocity of drum member 38, while the X-axis velocity at this position is zero. This dictates that the point of impact of blade 34 with food product P must occur past the 9:00 position where the X-axis is increasing and nearly matches the velocity of belt 22. The X-axis velocity of the blade 34 accelerates as the result of the geometry of its motion, and also as a function of any acceleration from the drum's rotational velocity. A good point of contact between blade 34 and food product P is about 45 degrees of rotation before the blade reaches bottom dead center.

Controlling the angular velocity of blade 34 relative to the velocity of belt 22 determines the length of each cut in the produce product P. When variable cut lengths are needed to optimize the utilization of the raw material the angular velocity of the blade 34 will be changed slightly with each cut by directions from programmable controller 1000 to variable speed motor 40.

The angle of the blade 34 relative to the X axis can be 90 degrees to give square cuts on the ends of the produce product P. However, the angle of the blade 34 can also be angled to provide angled end cuts if necessary or desirable.

The shape of the tip of blade 34 can be square for relatively flat feed belt shapes or the tip can be V-shaped to match the contour of the belt 22

The belt 22 can come in several different configurations. Belt 22 may be flat or V shaped. A flat belt can be contoured with a groove at its center, where the groove has a radius, V, or rectangular shape. Belt 22 may have a plurality of holes to which a vacuum source may be applied to help locate and fix product on the belt surface. A V-shaped belt may be configured from a flat belt with the addition of serrated side pieces, or it can be configured from two flat belts running at angles to each other. The belt position may be determined by means of transducer, such as encoder 30 fixed to the shaft of motor 28 which transmits data to programmable controller 1000.

A piece removal system 20 may immediately follow the radial cutter assembly 18 to direct any piece of newly cut product to one side of the belt 32 or the other. The embodiment of the piece removal system 20 depicted in FIGS. 1-7 is a flexible rotary concept that can divert a cut segment two ways with a 90-degree rotation in one direction or the other. The piece removal system 20 may also re-align cut product in line with the direction of feed. This feature may be necessary because the abrupt cutting process will typically propel cut product forward and sometimes at an angle away from the feed direction vector. Piece removal system 20 may have a bi-directional motor 60 which may be controlled by programmable controller 1000 as depicted in FIG. 1. A radial encoder 30 may be utilized to transmit positional information to programmable controller 1000.

The piece removal system 20 may be utilized to reject product from the belt, either to the left or to the right. The piece removal system 20 may also be utilized to segregate three different segments of a produce product. For example, a high value cut portion may be diverted to one side of belt 22, a rejected portion may be directed to the other side, while a "normal" portion remains on the belt.

Figure 5:
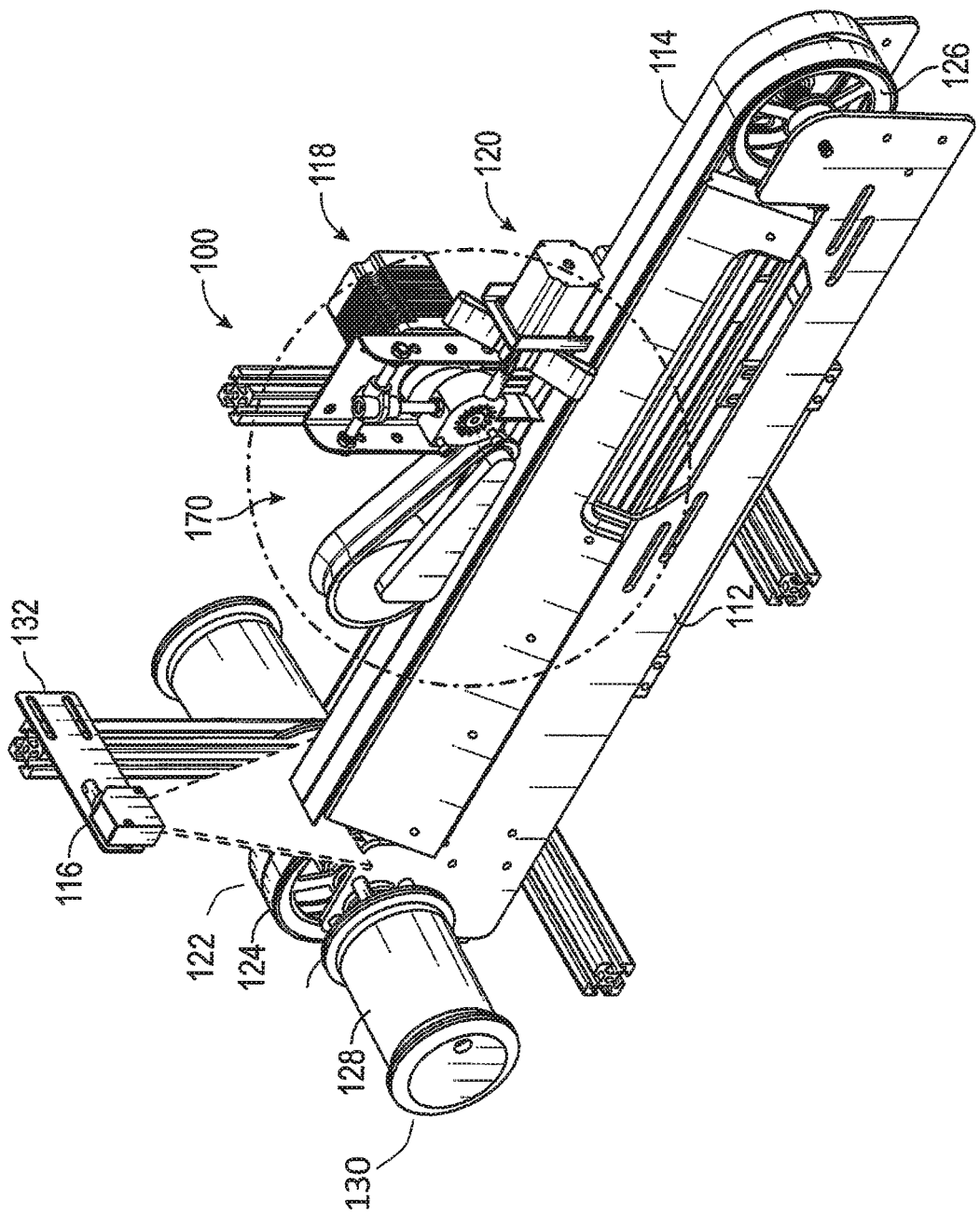
FIG. 5 depicts a perspective view of an embodiment of the present invention having an embodiment of a belt hold-down assembly.
Figure 6:
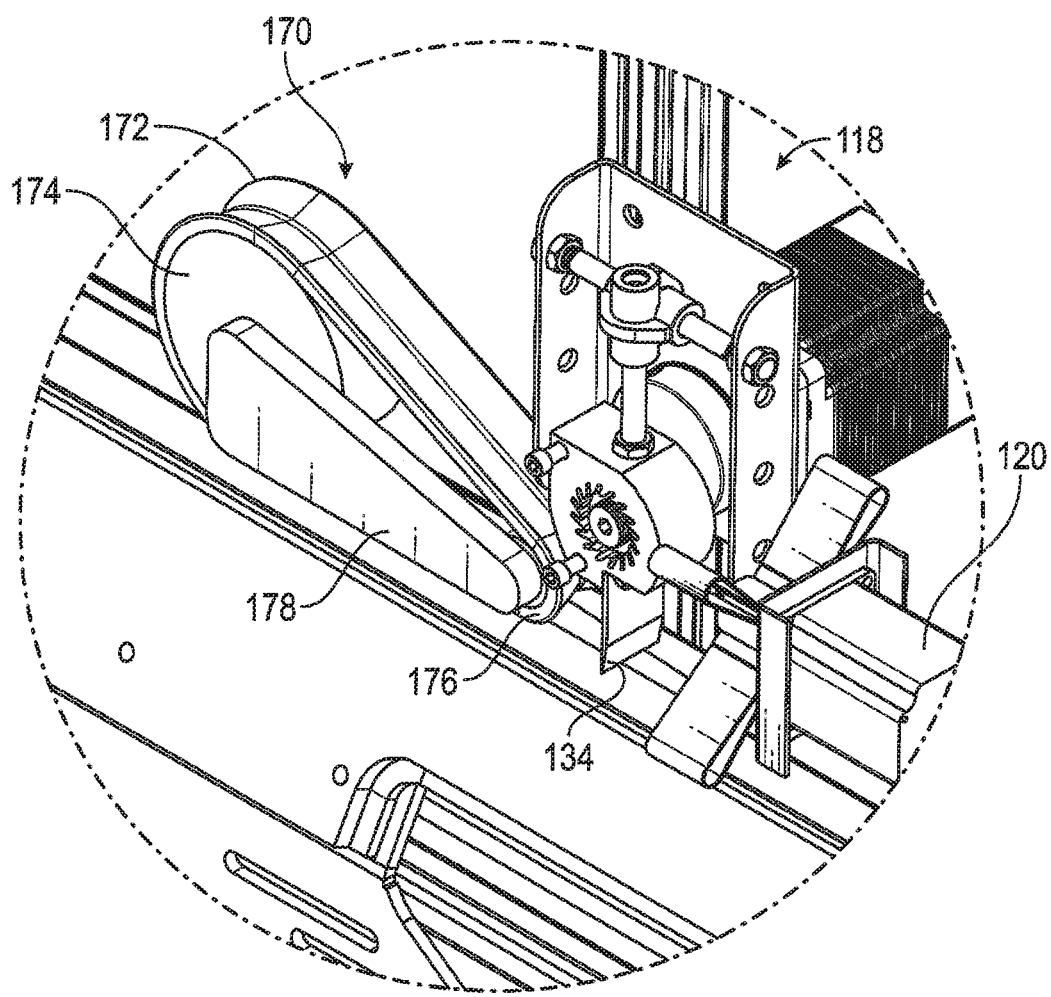
FIG. 6 depicts a close-up perspective view of the belt hold-down assembly of FIG. 5.

FIGS. 5-6 depict an embodiment of a produce cutting apparatus 100 which utilizes a belt-type product holding system 170 to secure the produce product P for the cutting process. Similar to the produce cutting apparatus 10 which does not utilize a belt-type product holding system (although produce cutting apparatus 10 may utilize a vacuum system), this embodiment of the produce cutting apparatus 100 has a frame 112, a feed belt assembly 114, a sensing device 116 and a radial cutter assembly 118. Feed belt assembly 114 generally comprises an endless loop belt 122 (or chain, conveyor, etc.) disposed on a drive wheel 124 and an idler wheel 126 which are mounted within a configuration of a frame assembly such as the frame 112 depicted in the figures. A variable speed motor 128 induces rotational motion to drive wheel 124 by direct drive, belts, drive reducers, transmission, or other coupling apparatus know in the art. A transducer, such as radial encoder 130 mounted on a shaft of motor 128, may be utilized to ascertain the position of the motor shaft and thereby generate output from which the velocity of belt 122 may be ascertained.

As depicted in the figures, one or more sensors 116 are mounted in a position to scan the produce products P as the products pass by on the belt 122 in proximity to the sensor. Sensor(s) 116 may be mounted on a bracket 132 which may suspend the sensor 116 above the belt 122. Similar to the system schematically depicted in FIG. 1, output from the sensor 116 is transmitted to programmable controller 1000. Output from the radial encoder 130 may also be transmitted to programmable controller 1000. Programmable controller 1000 may also control the speed of variable speed motor 128.

Produce holding system 170 is shown in greater detail in FIG. 6. Produce holding system 170 has a band 172 which is positioned above belt 122, where band 172 is configured to engage an upper surface of the produce product P and press it against belt 122. Band 172 is disposed on a first roller 174 and a second roller 176 which are mounted within frame 178. One of the rollers may be a drive roller connected to a motor (not shown). The motor may be controlled by the programmable controller 1000. A radial encoder may be utilized with the motor with the encoder providing data to the programmable controller 1000. Band 172 will typically be powered such that its velocity matches the velocity of belt 122.

Figure 7:
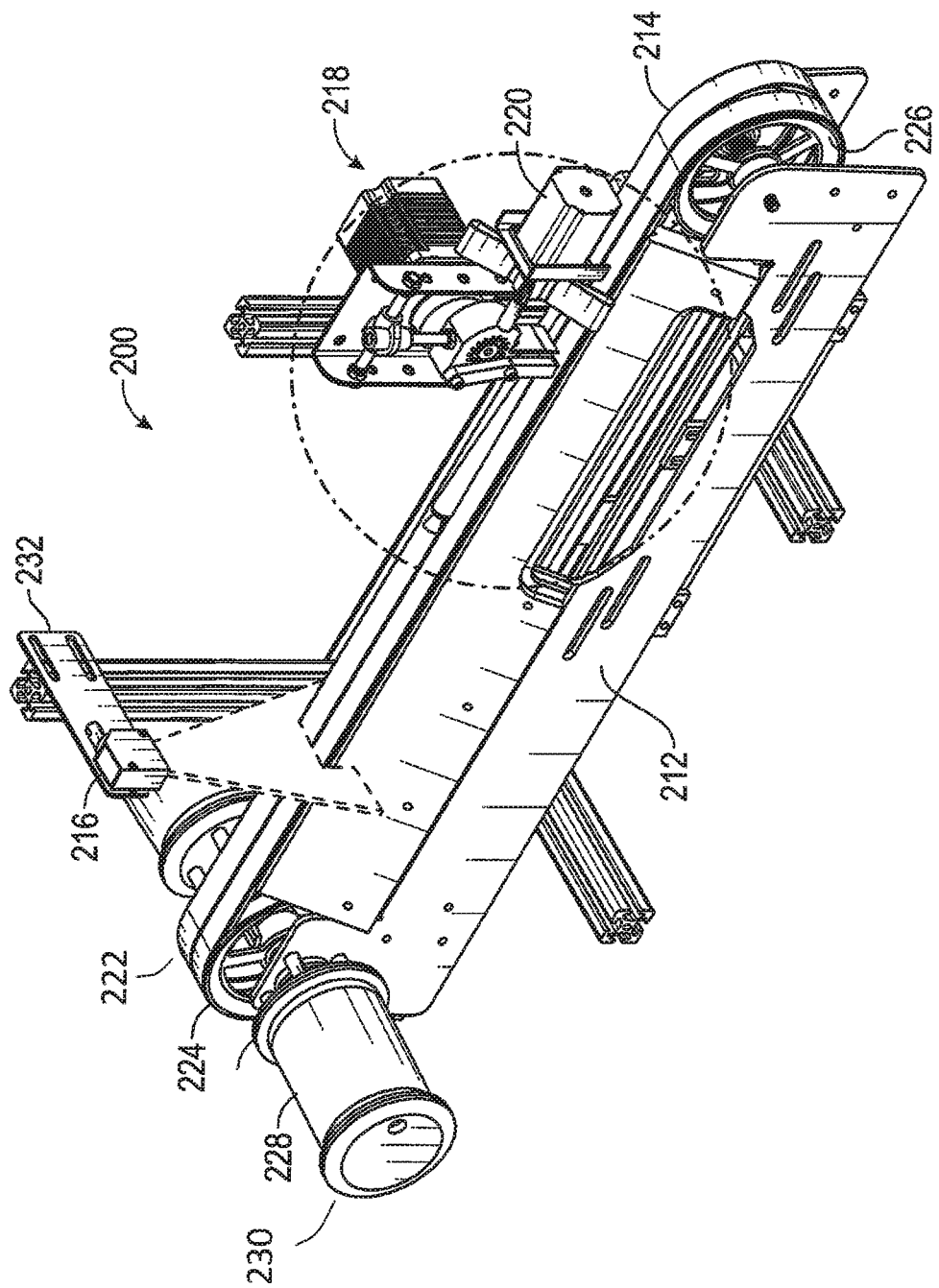
FIG. 7 depicts a perspective view of an embodiment of the present invention having an embodiment of a cutter assembly having a rotating hold-down mechanism.
Figure 8:
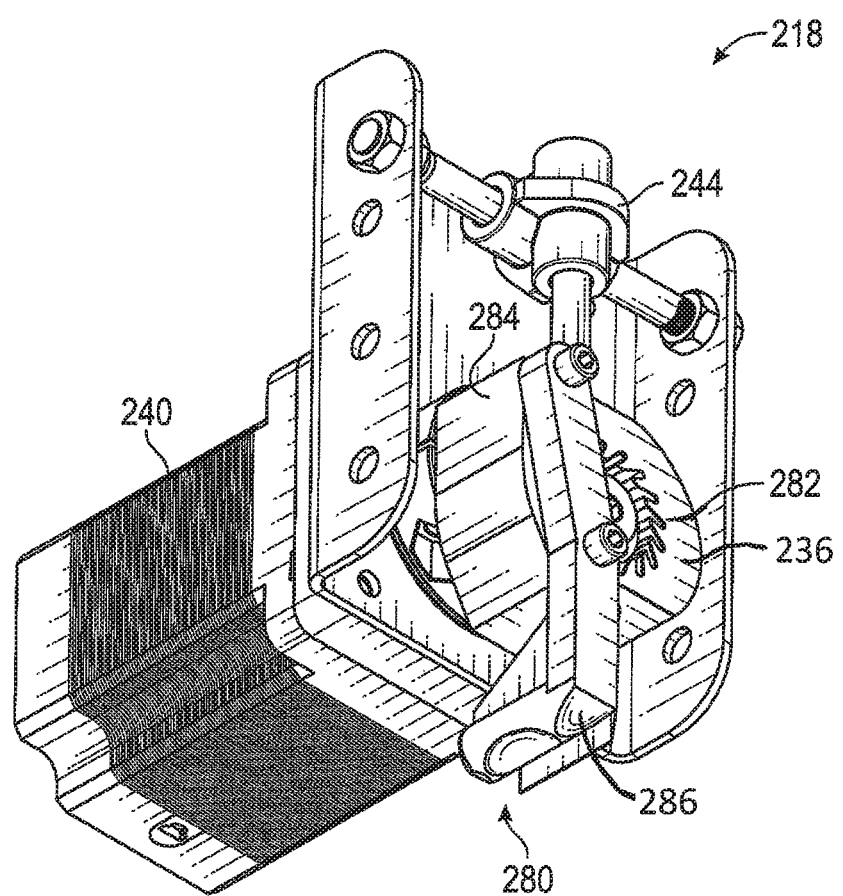
FIG. 8 depicts a close-up perspective view of the cutter assembly with the rotating hold-down mechanism of FIG. 7.
Figure 9:
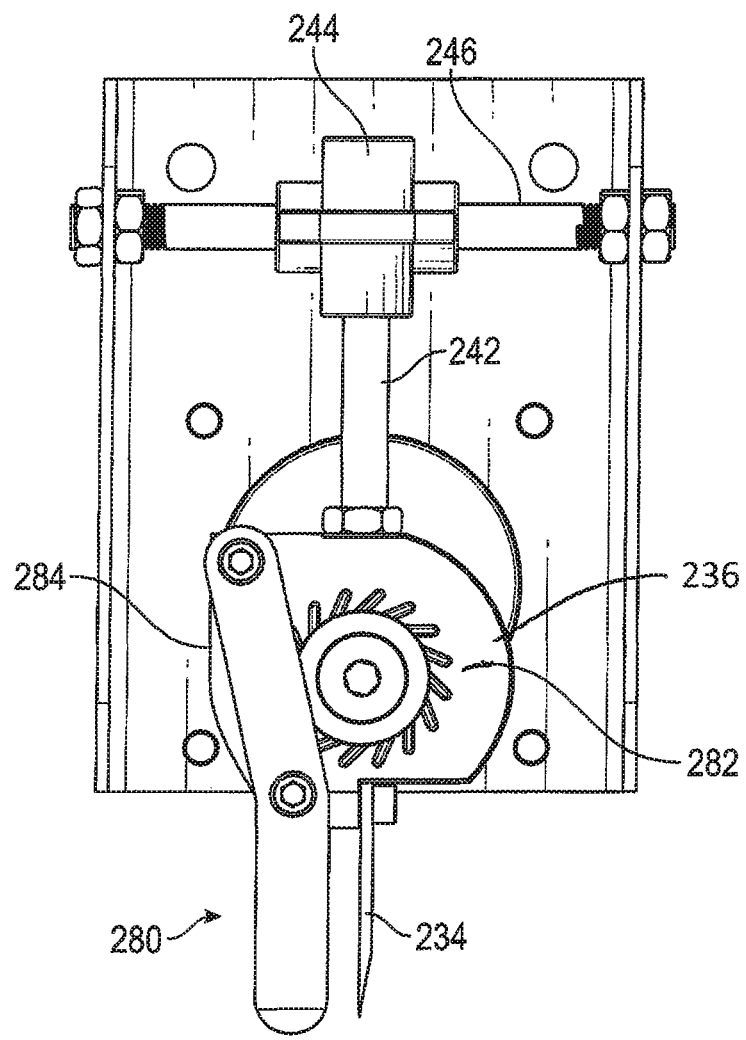
FIG. 9 depicts a front view of the cutter assembly of FIG. 8.

FIGS. 7-9 depict an embodiment of a produce cutting apparatus 200 which utilizes a mechanical-type product holding system 180 to secure the produce product P for the cutting process. Similar to the produce cutting apparatus 10 which does not utilize a mechanical type product holding system, this embodiment of the produce cutting apparatus 200 has a frame 212, a feed belt assembly 214, a sensing device 216 and a radial cutter assembly 218. Feed belt assembly 214 generally comprises an endless loop belt 222 (or chain, conveyor, etc.) disposed on a drive wheel 224 and an idler wheel 226 which are mounted within a configuration of a frame assembly such as the frame 212 depicted in the figures. A variable speed motor 228 induces rotational motion to drive wheel 224 by direct drive, belts, drive reducers, transmission, or other coupling apparatus know in the art. A transducer, such as radial encoder 230 mounted on a shaft of motor 228, may be utilized to ascertain the position of the motor shaft and thereby generate output from which the velocity of belt 222 may be ascertained.

As depicted in the figures, one or more sensors 216 are mounted in a position to scan the produce products P as the products pass by on the belt 222 in proximity to the sensor. Sensor(s) 216 may be mounted on a bracket 232 which may suspend the sensor(s) 216 above the belt 222. Similar to the system schematically depicted in FIG. 1, output from the sensor 216 is transmitted to programmable controller 1000. Output from the radial encoder 230 may also be transmitted to programmable controller 1000. Programmable controller 1000 may also control the speed of variable speed motor 228.

Produce holding system 280 is shown in greater detail in FIGS. 8-9. Produce holding system 280 may comprise an arm-pawl assembly 284 which is indexed by ratcheting wheel 282. With this apparatus, a product engagement member 286 is lowered and placed against the produce product P with each rotation of lobe member 236, with the produce product P being held in place immediately before the engagement of blade 234 with the produce product. Similar to the other embodiments, lobe member 236 is attached to rod 242. Rod 242 extends through guide 244, which allows vertical motion of rod 242 within the guide. Guide 244 is disposed on horizontal shaft 246.

Figure 10:
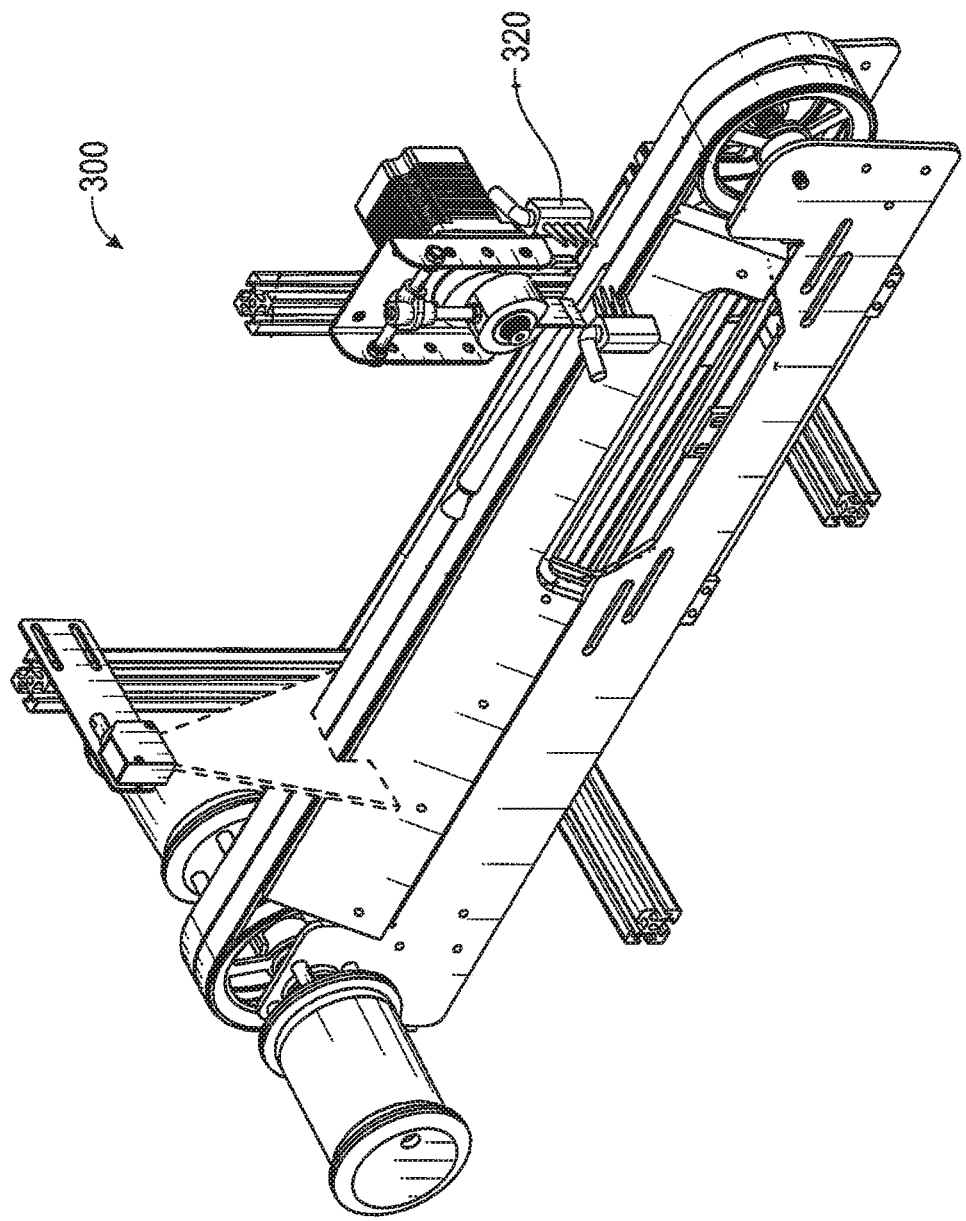
FIG. 10 depicts a perspective view of an embodiment of the present invention having a pneumatic piece removal system.
Figure 11:
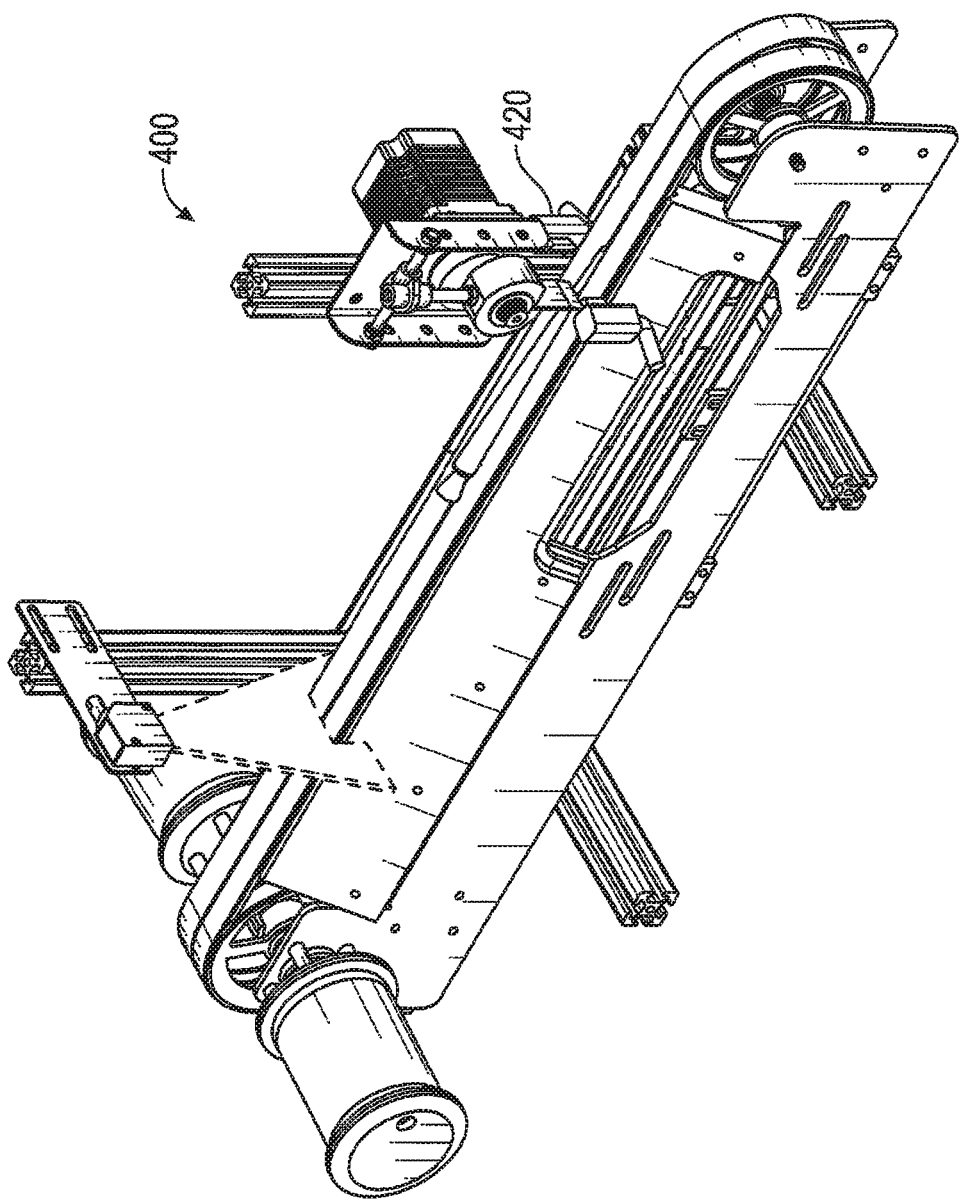
FIG. 11 depicts a perspective view of an embodiment of the present invention having a hydraulic piece removal system.
Figure 12:
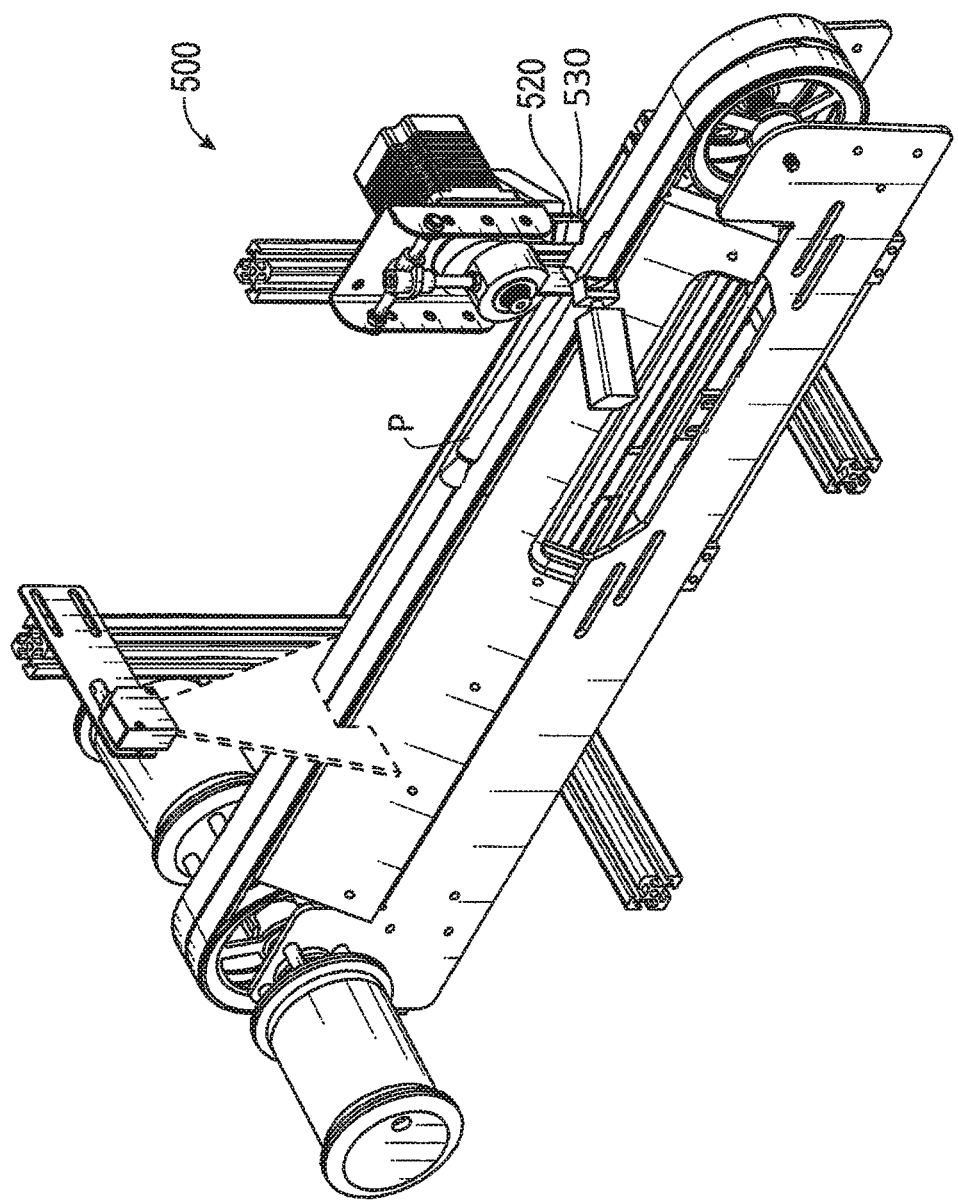
FIG. 12 depicts a perspective view of an embodiment of the present invention having a mechanical piece removal system.

Other types of piece removal systems may be utilized in place of the rotary type of piece removal system 20 described above. FIG. 10 depicts an embodiment of a produce cutting apparatus 300 which utilizes piece removal air jets 320. FIG. 11 depicts an embodiment of a produce cutting apparatus 400 which utilizes piece removal water jets 420. FIG. 12 depicts an embodiment of a produce cutting apparatus 500 which utilizes a mechanical piece removal system 520. In this embodiment, mechanically actuated diverters can be instructed to engage the cut sections of product. In each of these piece removal systems 320, 420, 520, the systems may be controlled by programmable controller 1000.

The process for achieving the above-described functions begins with setting the options programmable controller 1000 to identify the type of cutting process needed and set the parameters for the cutting and separation options within the chosen process. The physical process begins when singulated and separated product is fed into the cutting system inline with the direction of the belt 22, 122, 222. The product is scanned by means of one or more sensors 16, 116, 216 located near the entry of the cutting system. Sensor data is fed to programmable controller 1000 where the position, orientation, length and optionally diameter of the produce product P are calculated and used to prepare the radial cutter assembly 18, 118, 218 for its work. Belt speed determined from radial encoder 30, 130, 230 is also sent to the programmable controller 1000. Based on the calculations, the timing of an initial cut is prescribed to meet the first end cut requirement and subsequent cuts are prescribed to meet the segment and end cut requirements. The rotary cutter is parked in its home position. When the produce product P has advanced to the point on belt 22, 122, 222 where a controlled rotation of the cutter will intersect with the first cut, the cutter accelerates in rotation and makes the initial end cut. The speed of the cutter is coordinated with the belt speed so that segment cuts are made at the desired lengths. In many cases when cutting agricultural products of varying lengths, the segment cuts will divide the good product length found between the end cuts into varying lengths that comply with product specifications so that none of the good product is wasted. The leading and trailing end cuts may be diverted by means of piece removal systems 20, 320, 420, 520 that generally work perpendicular to the direction of product travel and rotates (or translates) to move any particular cut piece into another channel. In this way the undesirable end cut or cuts with defects may be eliminated at the cutting step and save separation downstream in the process. The piece removal function can divert product into two directions and in the case of tapered products this give the advantage of removing end cuts through one channel, removing long cuts from an end of the product into a second channel and allowing the segmented cuts to proceed down the cutter belt.

While the above is a description of various embodiments of the present invention, further modifications may be employed without departing from the spirit and scope of the present invention. Thus the scope of the invention should not be limited according to these factors, but according to the claims provided in the upcoming non-provisional patent application.

What is claimed is:

1. A produce cutting apparatus comprising:
   a feed belt configured to receive and transport a produce product along an x axis, wherein the feed belt has a linear velocity along the x axis;
   a transducer configured to determine and transmit the linear velocity of the feed belt;
   a sensor configured to scan the produce product, determine at least one dimensional feature of the produce product, and transmit the at least one dimensional feature;
   a radial cutter mechanism comprising a drum member attached to a motor, the radial cutter mechanism further comprising a cutting blade which moves in a circular path offset from a rotational center of the drum member, the radial cutter mechanism moving the cutting blade about the circular path such that the cutting blade approaches the feed belt along the y axis, makes a cut in the produce product, instantaneously travels along the x axis and is raised up from the circular path for another rotation, wherein the cutting blade makes a single cut in each complete rotation, wherein a desired length of a cut segment of the produce product is determined by an angular velocity of the cutting blade relative to the linear velocity of the feed belt; and
   a programmable controller which receives the linear velocity of the feed belt and the dimensional feature from the sensor, wherein the programmable controller ascertains a position, an orientation and a length of the produce product and adjusts the angular velocity to achieve the desired length of the cut segment.

2. The produce cutting apparatus of claim 1 further comprising a piece removal apparatus configured to remove a selected portion of the produce product from the feed belt.

3. The produce cutting apparatus of claim 2 wherein the piece removal apparatus comprises a flexible rotary apparatus capable of propelling the selected portion of the produce product to either side of the feed belt.

4. The produce cutting apparatus of claim 2 wherein the piece removal system comprises a plurality of water jets.

5. The produce cutting apparatus of claim 2 wherein the piece removal system comprises a plurality of pneumatic jets.

6. The produce cutting apparatus of claim 2 wherein the piece removal system comprises an actuated arm.

7. The produce cutting apparatus of claim 1 further comprising a produce holding system.

8. The produce cutting apparatus of claim 7 wherein the produce holding system comprises a band positioned above the feed belt, the band configured to engage an upper surface of the produce product and press the produce product against the feed belt.

9. The produce cutting apparatus of claim 8 wherein the band is disposed on a first roller and a second roller mounted within a frame.

10. The produce cutting apparatus of claim 7 wherein the produce hold system comprises an arm attached to the rotary cutting mechanism, the arm indexed to a rachet mechanism on the rotary cutting mechanism configured so that the arm engages the produce product immediately before the cutting blade makes a cut in the produce product.

11. The produce cutting apparatus of claim 1 wherein upon at a bottom of a stroke of the cutting blade, the velocity of the cutting blade along the x axis instantaneously exceeds the linear velocity of the feed belt.

12. The produce cutting apparatus of claim 1 wherein the sensor comprises any one or more from a group consisting of ultrasonic distance sensors, matrix/curtain sensors, edge sensors, color sensors, or camera systems.

13. The produce cutting apparatus of claim 1 wherein the transducer comprises a rotary encoder fixed to an axle of the feed belt.

14. The produce cutting apparatus of claim 1 wherein a lobe member is rotationally attached to the drum member at a point offset to a center of the drum member, wherein the cutting blade is affixed to the lobe member and rotation of the drum member is translated into a controlled rotary motion of the lobe member having a motion profile resolvable into a vector having an x component and a y component.

15. A produce cutting apparatus comprising:
- a feed belt configured to receive and transport a produce product along an x axis, wherein the feed belt has a linear velocity along the x axis;
- a transducer configured to determine and transmit the linear velocity of the feed belt to a programmable controller;
- a sensor configured to scan the produce product, determine at least one dimensional feature of the produce product, and transmit an output signal to the programmable controller;
- a radial cutter mechanism comprising a cutting blade configured to have a travel path along an x-axis and a y-axis, the cutting blade having a long axis, wherein the long axis is maintained in a parallel relation with the y-axis as the cutting blade follows the travel path, wherein the cutting blade makes a single cut in each complete rotation; and
- a motor having a variable range of speeds connected to the radial cutter mechanism, wherein the motor is configured to receive an input from the programmable controller to change to a specified speed and thereby control an elapsed time between each single cut of the cutting blade.

16. The produce cutting apparatus of claim 15 further comprising a piece removal apparatus configured to remove a selected portion of the produce product from the feed belt.

17. The produce cutting apparatus of claim 15 further comprising a produce holding system.

18. The produce cutting apparatus of claim 15 wherein, upon the cutting blade reaching a bottom of a stroke along the y-axis, the cutting blade has a velocity along the x-axis instantaneously exceeds the linear velocity of the feed belt.

19. A produce cutting apparatus comprising:
- a feed belt configured to receive and transport a produce product along an x axis, wherein the feed belt has a linear velocity along the x axis;
- a transducer configured to determine and transmit the linear velocity of the feed belt to a programmable controller;
- a sensor configured to scan the produce product, determine at least one dimensional feature of the produce product, and transmit an output signal to the programmable controller; and
- a radial cutter mechanism comprising a circular drum member attached at its center to a motor, the motor having a variable range of speeds wherein the motor is configured to receive an input from the programmable controller to change to a specified speed, the radial cutter mechanism further comprising a lobe member attached to the drum at a point offset to the center of the drum, wherein a cutting blade is affixed to the lobe member and rotation of the drum is translated into a controlled rotary motion of the lobe member thereby imparting to the cutting blade a travel path having an x-axis component and a y-axis component, the travel path having a lowermost position along the y-axis component, wherein the cutting blade completes a cut upon reaching the lowermost position, wherein the cutting blade makes a single cut in a complete rotation of the circular drum member.

* * * * *